Oct. 14, 1958  H. C. O'REILLY  2,856,100
WINDSHIELD-CLEANING ATTACHMENT
Filed May 17, 1954  2 Sheets-Sheet 1
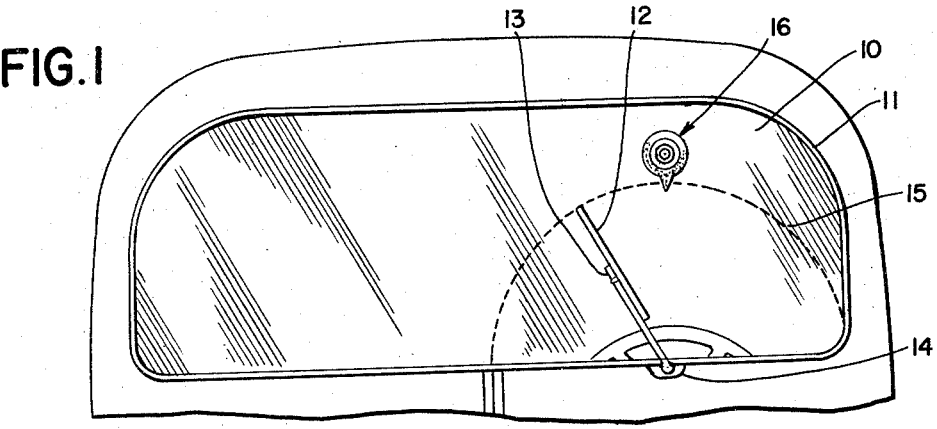
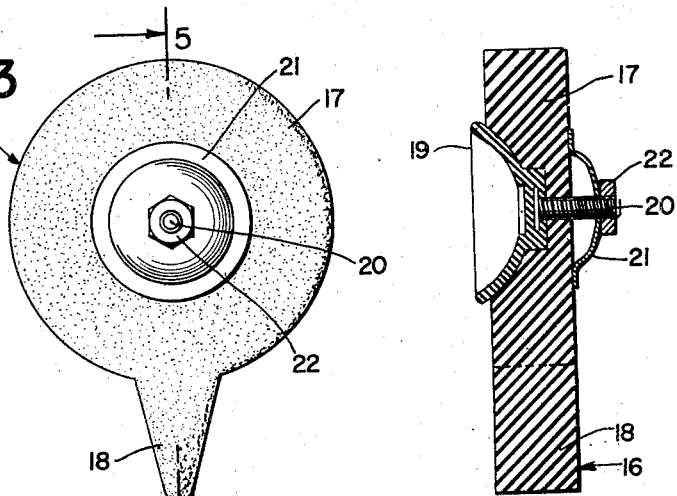
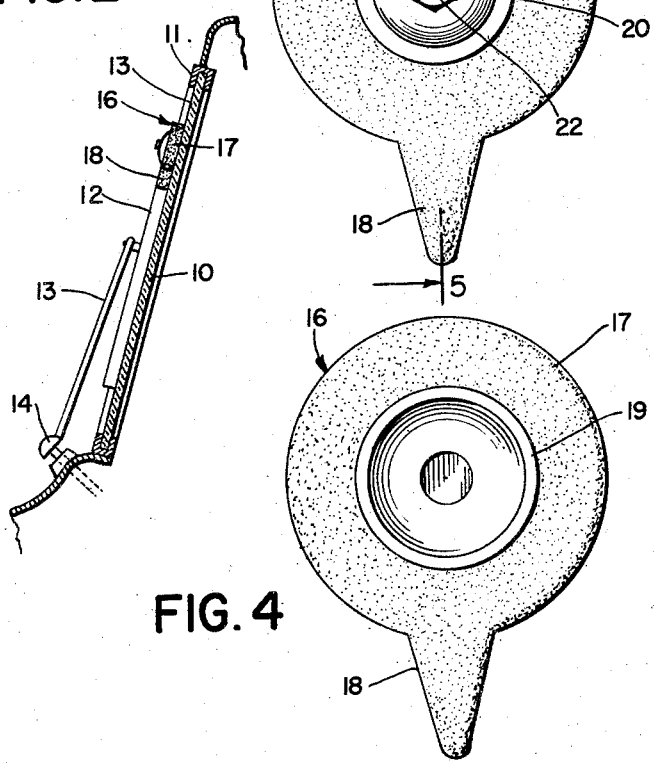
INVENTOR.
HUGH CAMPBELL O'REILLY
BY
Kenyon & Kenyon
ATTORNEYS Oct. 14, 1958   H. C. O'REILLY   2,856,100
WINDSHIELD-CLEANING ATTACHMENT
Filed May 17, 1954   2 Sheets-Sheet 2

INVENTOR.
HUGH CAMPBELL O'REILLY
BY
Kenyon & Kenyon
ATTORNEYS

United States Patent Office 2,856,100
Patented Oct. 14, 1958

2,856,100

WINDSHIELD-CLEANING ATTACHMENT

Hugh Campbell O'Reilly, New York, N. Y.

Application May 17, 1954, Serial No. 430,270

2 Claims. (Cl. 222—185)

The present invention relates generally to windshield-cleaning apparatus for automotive vehicles and the like, and more particularly to a windshield attachment adapted for actuation by an oscillatory windshield wiper to discharge a cleaning fluid onto the surface of the windshield.

The safe operation of a vehicle requires a clear field of vision. Where the glass windshield of the vehicle is obscured by foreign matter such as dust, dirt and grime, one cannot wipe away these substances with a conventional windshield wiper. Such substances tend to adhere to the surface of the windshield and are not removed by rain-water or by the sweeping action of the wiper blade. Another common difficulty experienced in the operation of a vehicle is so-called "road shine" formed by the spattering from other cars of oil and grease particles onto the windshield surface. While it is possible to clear the surface of the windshield of this oily layer by the use of a suitable solvent, heretofore this could not conveniently be effected while the car was in motion.

Accordingly, it is the main object of this invention to provide an attachment for a windshield adapted for actuation by reciprocal movement of a conventional windshield wiper to eject a cleaning fluid onto the surface of the windshield.

More particularly, it is an object of the invention to provide an attachment of the above-described type which may be affixed to the windshield at a position wherein the emitted cleaning fluid is trickled into the operative area and the wiper blade to effect the desired cleansing action.

Still another object of the invention is to provide an attachment of the character described, containing a cleaning-fluid reservoir and means to discharge a droplet of said fluid with each actuation of the attachment by the wiper blade.

It is a further object of the invention to provide an attachment of the character described which may be secured to the windshield at a preferred position thereon without the use of screws or other mechanical clamping means and without alteration of the windshield.

Also, an object of the invention is to provide an attachment of the character described which is of simple and sturdy construction and which may be economically manufactured and sold.

For a better understanding of the invention as well as other objects and further features thereof, reference is made to the following detailed description thereof to be read in connection with the accompanying drawing wherein like elements in the several views are identified by like reference numerals.

In the drawing:

Fig. 1 is a fragmentary, front elevation of a motor vehicle equipped with one preferred embodiment of a windshield attachment, in accordance with the invention.

Fig. 2 is a side view, depicting the windshield wiper in co-operative relation with the attachment.

Fig. 3 is a top plan view of the attachment.

Fig. 4 is a bottom plan view of the attachment.

Fig. 5 is a sectional view of the attachment taken along plane 5—5 in Fig. 3.

Figure 6:
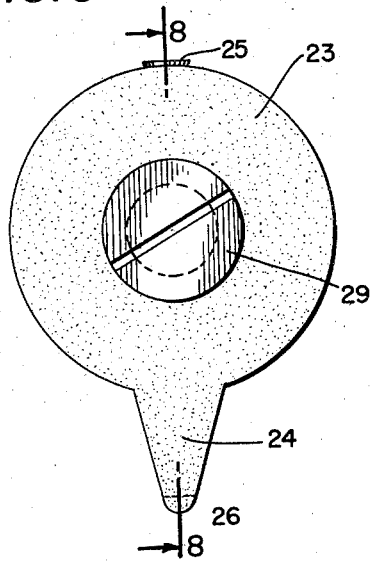
Fig. 6 is a top plan view of a second preferred embodiment of a windshield attachment in accordance with the invention.

Referring now to the drawings and more particularly to Fig. 1, there is shown a conventional car body of modern construction comprising a glass windshield 10 and a supporting frame 11. Mounted on the windshield is a conventional windshield wiper, comprising a squeegee or blade 12 detachably connected to the upper end of a wiper-actuated arm 13 whose lower end is attached to an oscillatory shaft 14. Shaft 14 is mounted below frame 11 and is coupled to a suitable motor (not shown) which may be either of the pneumatic or electric type. Wiper blade 12 rests against the surface of windshield 10, the oscillatory movement of shaft 14 causing the blade to swing back and forth in an arc about shaft 14 at the center. The operating arc of the wiper blade is indicated in Fig. 1 by dash-line 15. Thus, the wiper blade 10 rubs along the surface of the glass during the oscillatory movement thereof.

Mounted on windshield 10 in the path of the operating arc of the wiper blade is an attachment generally designated by numeral 16. Attachment 16, as best seen in Figs. 3, 4 and 5, comprises a generally circular body 17 of uniform thickness, body 17 having a V-shaped projection 18. The body is formed of a sponge-like material adapted to absorb and store a cleaning fluid. Body 17 is attached to windshield 10 by means of a suction cap 19 nesting in a similarly-shaped concave recess formed in the bottom portion of the body and provided with an upright mounting screw 20. Suction cup 19 is securely held to the sponge-like body by means of a dome-shaped metal washer 21 having a circular rim, the washer being mounted on screw 20 and being held thereon by a nut 22. The rim of washer 21 engages an annular area on the upper face of body 17 and prevents lateral displacement of suction cup 19.

To install attachment 16, suction cup 19 is pressed onto the windshield at a position wherein only projection 18 extends into the operating arc of the wiper. Preferably, attachment 16 is positioned with the projection 18 in vertical alignment with shaft 14 of the wiper. Thus, as wiper blade 12 swings across the windshield, the tip of the blade will strike projection 18 once in the forward swing and once in the return swing. Sponge body 17 is saturated with a suitable chemical solvent, such as di-ethylene glycol mono ethyl ether, so that each time projection 18 is struck by the wiper blade, a droplet of the solvent drips onto the windshield. The sponge-like projection 18 in no way hampers the operation of the windshield wiper and is readily flexed when struck by the blade. Save for the small projection 18, the body of the attachment is outside the field of vision encompassed within the operating arc of the wiper, hence it offers no interference with the driver's view. This droplet, which is emitted both in the forward and return movement of the wiper, is smeared across the surface of the glass. With the wiper action of the blade, all grease and grime is removed from the windshield in the operative area of the wiper to clear the field of vision for the driver. If preferred, the sponge-like body may in a heavy storm be saturated with glycerine or a liquid having similar properties to prevent the accumulation of rain-drops upon the windshield surface.

Figure 7:
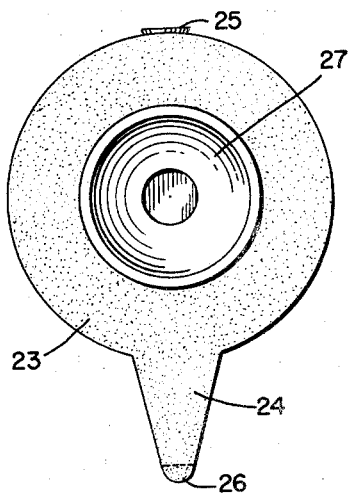
Fig. 7 is a bottom plan view of said second embodiment.
Figure 8:
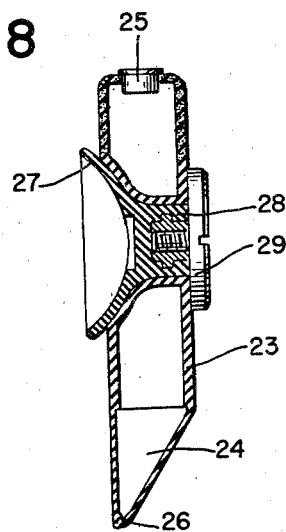
Fig. 8 is a sectional view taken along plane 8—8 in Fig. 6.

Referring now to Figs. 6, 7 and 8, there is shown a modified form of attachment wherein the reservoir for the cleaning solvent takes the form of a generally toroidal or doughnut-shaped hollow container 23, having a V-shaped projecting nozzle 24. The container walls are fabricated of a flexible material such as vinyl plastic, the walls of the projecting nozzle 24 being relatively thin and deformable. Container 23 is provided with a removable stopper 25 at the end thereof opposite to the position of nozzle 24. Nozzle 24 is provided with self-sealing lips 26 such that normally the nozzle outlet is closed and will not leak the contents of the container.

For detachably mounting the container onto the windshield of a vehicle, a flexible suction cup 27 is provided, having a relatively rigid cylindrical upright post 28 formed integrally therewith. Post 28 is forced into the central opening of toroidal container 23 whereby the suction cup nests within a concave depression formed in the bottom of the container.

The attachment, as in the case of the device shown in Fig. 1, is placed so that the nozzle 24 extends into the operating arc of the wiper blade, whereby the blade in the course of its swing will strike the nozzle. Thus, in the forward swing of the wiper blade, the nozzle will be struck laterally and in the return swing, the nozzle will be struck on the opposing side. The resulting deformation of the nozzle wall will bring internal pressure to bear on the fluid in the container and force open lips 26 momentarily to discharge a droplet of the cleaning fluid. Thus, the action of the device disclosed in Figs. 6-8 is similar to that of Fig. 1. To refill the container, one has merely to pry open stopper 25. Alternatively, the container may be constructed without a stopper, the container being filled by means of a cleaning-fluid can having an elongated outlet nose adapted to pry open lips 26.

While there has been shown what are at present considered to be preferred embodiments of the invention, it will be manifest that many changes and modifications may be made therein without departing from the essential spirit of the invention as defined in the appended claims.

What is claimed is:
1. A windshield attachment for a vehicle provided with a reciprocating wiper blade swingable within a given arc, comprising a hollow fluid container having a toroidal portion and a projecting nozzle portion, said nozzle portion having deformable walls and self-sealing lips, and means including a suction cup for mounting said toroidal portion on said windshield at a position at which said nozzle portion lies within said arc whereby said blade strikes same to discharge said fluid.

2. A windshield attachment for a vehicle provided with a reciprocating wiper blade swingable within a given arc, comprising a hollow fluid container having a toroidal portion and a pressure-responsive, projecting nozzle portion, said nozzle portion having deformable walls and self-sealing lips, and a suction cup member mounted at the underside of said toroidal portion and provided with an integral post fitting within the opening of said toroidal body, and a screw extending into said post and having a head engaging the upperside of said toroidal portion.

References Cited in the file of this patent
UNITED STATES PATENTS

| | | |
|---|---|---|
| 1,729,025 | Blair | Sept. 24, 1929 |
| 1,738,884 | Gearhart | Dec. 10, 1929 |
| 2,105,676 | Stow | Jan. 18, 1939 |
| 2,516,311 | Ganz | July 25, 1950 |

FOREIGN PATENTS

| | | |
|---|---|---|
| 410,259 | Great Britain | May 17, 1934 |